Figure 1:
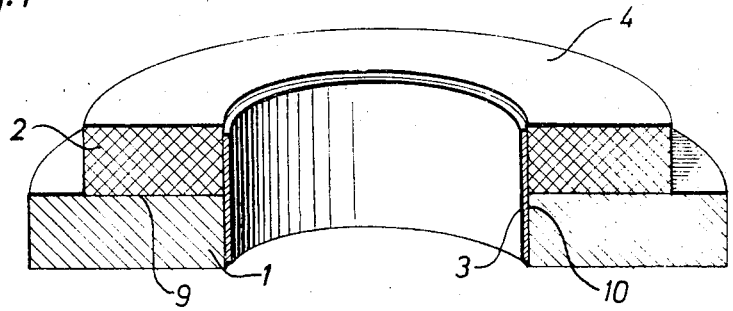

United States Patent [19]

Ståhl

[11] 3,770,181

[45] Nov. 6, 1973

[54] SEALING RING FOR SLIDE-RING SEALS
[75] Inventor: Filip Torvald Ståhl, Alvsjo, Sweden
[73] Assignee: Stenberg-Flygt AB, Solna, Sweden
[22] Filed: Dec. 7, 1971
[21] Appl. No.: 205,676

[30] Foreign Application Priority Data
Dec. 30, 1970 Sweden.............................. 17815/70

[52] U.S. Cl. .............................................. 277/96
[51] Int. Cl............................................. F16j 15/34
[58] Field of Search .................. 277/96, 38, 81, 92, 277/96 A

[56] References Cited
UNITED STATES PATENTS
2,447,930  8/1948  Biggs................................. 277/96 R
1,364,082  1/1921  De Luiz ............................. 277/96 R
2,249,930  7/1941  Bailey et al. ...................... 277/96 R
2,820,653  1/1958  Yokel................................. 277/96 R Primary Examiner—George E. Lowrance
Assistant Examiner—Robert I. Smith
Attorney—Richard C. Sughrue et al.

[57] ABSTRACT

Sealing ring for slide-ring seals, composed of a hard material ring and a supporting ring, the supporting ring and the hard material ring having an essentially radial surface of contact with one another, the supporting ring and the hard material ring being held together by means of a resilient collar or sleeve at the supporting ring, which sleeve is rolled or pressue-turned against the hard material ring and thus holds it to the supporting ring.

5 Claims, 8 Drawing Figures

PATENTED NOV 6 1973 3,770,181

SEALING RING FOR SLIDE-RING SEALS

The invention relates to a sealing ring for slide-ring seals composed of a hard material ring and a supporting ring.

Sealing rings for slide-ring seals of this kind come into use, for example, when a seal is to be provided between a rotating shaft and a stationary housing. The primary seal in such an application takes place between a stationary first sealing ring connected to the stationary part and a second sealing ring sliding against the first sealing ring and jointed to the rotating part. Secondary seals are in turn provided between the sealing rings and the associated stationary and rotating parts.

Materials used for such sealing rings for slide-ring seals are, for instance, carbon, bronze, hardened steel, ceramics or sintered carbide. As secondary seals between sealing rings and associated machinery part use is usually made of O-rings, cuffs, sealing wedges, bellows or the like. If the sealing rings consist of carbon, bronze or other turnable material, there is no great difficulty in the manufacture in achieving the tolerances necessary for the primary and secondary seals. But if the sealing rings are made of hard materials, e.g. sintered material such as ceramics or sintered carbide, the manufacturing tolerances become rather large owing to deformation in the sintering. Tolerances up to ± 10 percent are counted on. Turning of such sintered materials is not at present possible, but the rings must be ground to obtain the necessary tolerances. Diamond wheels are required for such grinding, which is therefore extremely expensive.

To save expensive sealing material and to give the sealing rings made of hard material as easily manufacturable a form as possible, preferentially a rectangular section, it has been earlier proposed that sealing rings requiring ceramics, sintered carbide or other hard material in the primary seal should be made in two parts, a hard material ring and a supporting ring of steel, bronze or other easily machined material. This supporting ring must be jointed to the hard material ring, which can be done by vulcanizing them with a layer of rubber placed between them or by gluing them together. Glue and rubber, however, withstand only limited heating, which constitutes a considerable risk owing to the frictional heat generated in operation. Furthermore glue and rubber are sensitive to certain solvents and fluids.

The procedure of soldering together the hard material ring and the supporting ring is also known. Soldering, however, causes deformation owing to the influence of temperature and to thermal stresses, as the hard material has a coefficient of thermal expansion about half to one-quarter that of, for example, steel. The junction, usually consisting of silver solder or bronze solder, is also sensitive to certain corrosive fluids and heat.

The jointing together of the hard material ring and supporting ring by a shrink fit is also known in this context. According to practical experience, however, this shrink fit may fail in the event of overheating, in which case the hard material ring may readily start to rotate in the supporting ring, wear down the attachment surfaces and not be retained again, when the seal has cooled down. A shrink fit, furthermore, requires precise grinding.

The object of the present invention is to eliminate or at least considerably reduce the grinding work, and thus the machining costs in the production of such composite sealing rings, to keep down the consumption of expensive sealing material, to allow as easily manufacturable a form as possible for the sealing rings made of hard material, preferentially a rectangular cross-sectional form, to allow simple and inexpensive jointing of the hard material ring and the supporting ring, and, finally, to extend the applications for such hard material rings in the presence of corrosive fluids and high temperature.

This is achieved according to the invention by means of a sealing ring for slide-ring seals composed of a hard material ring and a supporting ring, the supporting ring and the hard material ring having an essentially radial surface of contact with one another, characterized in that they are held together through the fact that the supporting ring has a resilient collar or sleeve which is rolled against the hard material ring and thus holds it to the supporting ring. Through the invention, accordingly, soldering, gluing or vulcanization and shrink fitting are all avoided, i.e. jointing procedures which are sensitive to solvents and certain other fluids, temperature or corrosion. The object of the invention does not give rise to thermal stresses in the sealing ring. The components of the sealing ring according to the invention can move relatively freely on changes of temperature, whereby the stresses can be evened out. The sealing ring does not become warped in conjunction therewith.

According to the invention the collar or sleeve may be a separate part that is jointed to the supporting ring and the hard material ring. According to an alternative embodiment the collar projects essentially axially from the supporting ring and is made integral with it. It is advisable in such case to arrange a groove between the root of the collar and the surface of contact between the supporting ring and the hard material ring. This groove improves the resilience of the collar. The groove can be made as an open slot for insertion of the secondary seal, for example in the form of an O-ring or the like, which is inserted afterwards and the material for which can be chosen to suit the requirement.

The collar or sleeve may be partially slit and be conical at the attachment in order to facilitate the jointing of the parts of the sealing ring by rolling, pressure turning or similar forming procedure.

The hard material and supporting rings may either be in direct contact with one another or separated by spacers to even out any irregularities, for example in the form of a washer of soft material such as copper, brass, plastic, rubber or the like.

The hard material ring and possibly also the supporting ring may be furnished with driver slots or bosses to improve the engagement.

The provision of secondary sealing between the supporting ring and the hard material ring prevents the penetration of corrosive fluids between them to the surface of contact between the hard material ring and the collar or sleeve. One can thus maintain good contact between these two rings and, among other factors, satisfactory discharge of frictional heat from the hard material ring into the supporting ring.

The rolling or pressure turning is preferentially done by rolling the collar or sleeve either onto the inside diameter of the hard material ring or onto its outside diameter, or both onto its outside and inside diameters. The rolling increases or decreases the diameter of the collar- or sleeve-shaped part depending on whether the part lies against the inside or outside of the hard material ring and supporting ring.

Through the change of diameter the tubular part will hold the hard material ring with a grip which is equivalent to force fit or shrink fit. The pressure in the surface of the fit will depend on how the rolling is done and on the material properties and wall thickness of the collar- or sleeve-shaped part. In some cases it may be desirable to increase the grip between the tubular or sleeve-shaped part and the hard material ring and supporting ring. This can be achieved through a conical form of ring or by the use of axial slots or grooves. During the rolling operation material from the collar- or sleeve-shaped part penetrates into them, so increasing the locking force between the supporting ring and hard material ring.

In some cases it may be desirable to reduce the grip between the collar- or sleeve-shaped part and the hard material ring and supporting ring. This is the case especially if the material in the hard material ring is brittle. Reduction of the grip or surface pressure can be achieved by reducing the wall thickness of the collar- or sleeve-shaped part or by providing it with one or more axial slits of limited length.

The secondary seal between the supporting ring and the hard material ring may consist of a known form of gasket, O-ring or other sealing means, possibly with soft, hardenable sealing compound.

The invention will now be described with reference to the attached drawing which schematically represents some of its embodiments.

Figure 6:
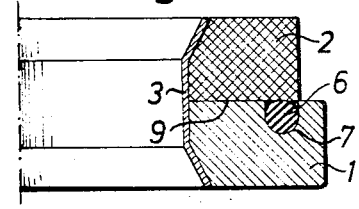
Figure 7:
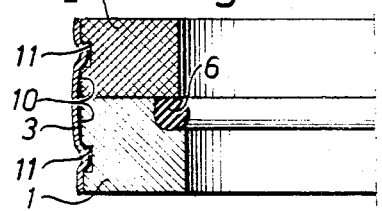
Figure 8:
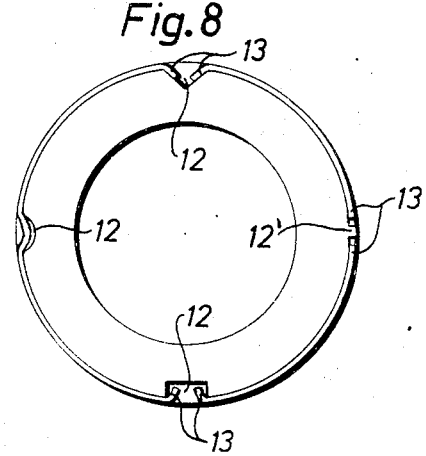

FIG. 1 shows a perspective representation of a sealing ring according to the invention with an axial sectional area, FIGS. 2–7 sections of different sealing rings according to the invention in axial section, and FIG. 8 a radial section through a sealing ring according to the invention, with four embodiments of the hard material ring in its four sectors.

FIG. 1 shows in axial section a supporting ring 1 and, abutting it axially, a hard material ring 2. These two rings are held together by an internally rolled-on sleeve 3. The hard material ring has an easily manufactured rectangular section and need be ground only at the sliding seal surface 4. Its other surfaces may be unmachined.

Figure 2:
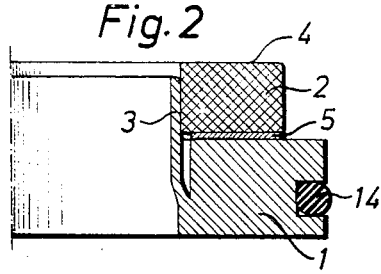
Figure 5:
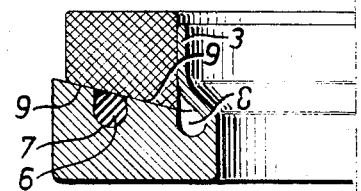

In FIG. 2 the sleeve 3 has been replaced by a collar 3 projecting roughly axially from the supporting ring 1 and internally engaging with the hard material ring 2 and holding it from inside. Between the hard material ring and the supporting ring there has been inserted a soft copper disc 5 as secondary seal, which at the same time allows satisfactory discharge of heat from the hard material ring. 14 is an extra secondary seal between the supporting ring 1 and adjacent machinery elements. This figure, as also the subsequent ones, shows only one section of the ring, corresponding to the right-hand part of FIG. 1. FIGS. 5 and 7, however, correspond to the left-hand part of FIG. 1.

Figure 3:
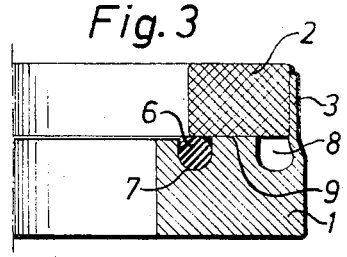

In the embodiment in FIG. 3 the copper disc has been replaced by a secondary seal 6 in the form of an O-ring 6 inserted in a slot 7 in the supporting ring 1. As in the preceding example the sleeve is replaced by a collar 3 projecting from the supporting ring, the collar holding the hard material ring 2 from outside. Note again the groove 8 situated at the foot of the collar 3 and improving the deformability of the collar.

Figure 4:
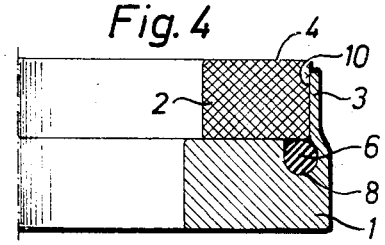

In the embodiment in FIG. 4 the collar 3, as in the preceding example, grips the hard material ring 2 from outside. The groove 8 at the foot of the collar 3 is here used at the same time for reception of the secondary seal 6. The surface of contact between the collar 3 and the hard material ring 2 is denoted 10.

FIG. 5 shows another possibility of placing the secondary seal 6. The surface of contact 9 between the hard material ring 2 and the supporting ring 1 slopes obliquely inwards, so that the hard material ring 2 can to some extent be relieved of tensile stresses when it is pressed against the second hard material ring, not shown in the figure, of the sliding seal.

In the embodiment in FIG. 6 the inside diameter both of the hard material ring 2 and of the supporting ring 1 increases in the direction away from their common surface of contact 9 after a cylindrical mid-section. They are held together internally through a pressure-turned sleeve 3. This ensures a very good cohesion in the axial direction.

The same aim is attained in the embodiment in FIG. 7, in which grooves 11, into which the sleeve 3 is rolled, are arranged in the surface of contact 10 between the sleeve 3, on the one hand, and the hard material ring 2 and supporting ring 1 on the other.

FIG. 8, finally, shows in a radial section three axial slots 12 into which the collar or sleeve 3 are rolled. In this way the driving action between the supporting ring and the hard material ring can be made more effective without increasing the radial pressure on said rings. If desired, the collar can be slit at these axial slots and the edges 13 of the slits can be folded into them. The slits naturally extend only along a part of the axial length of the sleeve. Instead of slots, of course, bosses 12' or the like may be provided which engage in the slits (see right-hand portion of FIG. 8).

Although the invention has been described with reference to one of its embodiments, it can nevertheless be arbitrarily varied within the scope of the subsequent claims.

I claim:

1. A sealing ring assembly for slide-ring seals, comprising a hard material ring and a supporting ring, said supporting ring and said hard material ring having an essentially radial surface of contact with each other, said supporting ring being provided with a resilient sleeve projecting generally axially from said supporting ring a distance less than the axial length of said hard material ring, a groove formed in said supporting ring adjacent the point of projection of said resilient sleeve from said supporting ring and adjacent the surface of contact between said supporting ring and said hard material ring, said resilient sleeve being rolled radially against said hard material ring to hold said hard material ring against said supporting ring and a sealing means positioned between and in contact with the support ring and hard material ring.

2. A sealing ring assembly according to claim 1, in which said sleeve is made integral with said supporting ring.

3. A sealing ring assembly according to claim 1, in which said groove contains said sealing means which is of an O-ring.

4. A sealing ring assembly according to claim 1, in which said sealing means is a washer of soft material.

5. A sealing ring according to claim 1, in which the sleeve holds the hard material ring from a radially inner surface.

* * * * *